United States Patent
Tsirkin

(10) Patent No.: US 10,394,586 B2
(45) Date of Patent: Aug. 27, 2019

(54) USING CAPABILITY INDICATORS TO INDICATE SUPPORT FOR GUEST DRIVEN SURPRISE REMOVAL OF VIRTUAL PCI DEVICES

(71) Applicant: Red Hat Israel, Ltd., Raanana (IL)

(72) Inventor: Michael Tsirkin, Yokneam Illit (IL)

(73) Assignee: Red Hat Israel, Ltd., Raanana (IL)

( * ) Notice: Subject to any disclaimer, the term of this patent is extended or adjusted under 35 U.S.C. 154(b) by 94 days.

(21) Appl. No.: 14/826,037

(22) Filed: Aug. 13, 2015

(65) Prior Publication Data

US 2017/0046187 A1    Feb. 16, 2017

(51) Int. Cl.
G06F 9/455 (2018.01)

(52) U.S. Cl.
CPC ...... *G06F 9/45558* (2013.01); *G06F 9/45554* (2013.01); *G06F 2009/45562* (2013.01); *G06F 2009/45579* (2013.01)

(58) Field of Classification Search
CPC ............. G06F 9/45558; G06F 9/45554; G06F 2009/45562; G06F 2009/45579
See application file for complete search history.

(56) References Cited

U.S. PATENT DOCUMENTS

| | | | |
|---|---|---|---|
| 7,836,238 B2 | 11/2010 | Freimuth et al. | |
| 8,069,228 B2 | 11/2011 | Bramley et al. | |
| 8,225,334 B2 | 7/2012 | Green et al. | |
| 8,301,818 B2 | 10/2012 | Zou et al. | |
| 8,412,860 B2 | 4/2013 | Kishore et al. | |
| 8,429,322 B2 | 4/2013 | Tsirkin | |
| 8,554,957 B1 * | 10/2013 | Wieland | G06F 9/4411 710/8 |
| 8,856,788 B2 | 10/2014 | Tsirkin et al. | |
| 9,043,789 B2 | 5/2015 | Tsirkin et al. | |
| 2003/0069961 A1 * | 4/2003 | Kaushik | G06F 13/4027 709/224 |
| 2005/0132366 A1 * | 6/2005 | Weast | H04L 12/2803 718/1 |
| 2007/0011500 A1 * | 1/2007 | Dasari | G06F 11/0745 714/100 |
| 2007/0156942 A1 | 7/2007 | Gough | |

(Continued)

OTHER PUBLICATIONS

[Xen-Devel] [Patch 4/4] xen: Fix PV-on-HVM, http:lists.xen.org/archives/html/xen-devl/2012-05/msg01131.html, UNIX Foundation Collaborative Projects, Xen project Mailing List, 2 pages, published on May 16, 2012.

(Continued)

*Primary Examiner* — Meng Ai T An
*Assistant Examiner* — Michael W Ayers
(74) *Attorney, Agent, or Firm* — Lowenstein Sandler LLP

(57) ABSTRACT

A hypervisor receives a notification from a guest operating system of a virtual machine that includes a capability indicator of support provided by a virtual device driver for recovering from a surprise removal of a corresponding virtual device from the virtual machine. The hypervisor, upon receiving a request to remove the virtual device from the virtual machine, uses the capability indicator received from the guest operating system to identify one or more actions to be performed to remove the virtual device from the virtual machine. The hypervisor then removes the virtual device from the virtual machine using the identified actions.

20 Claims, 9 Drawing Sheets

(56) References Cited

U.S. PATENT DOCUMENTS

| | | |
|---|---|---|
| 2007/0180493 A1 | 8/2007 | Croft et al. |
| 2008/0294825 A1 | 11/2008 | Mahalingam et al. |
| 2009/0113422 A1* | 4/2009 | Kani .................. G06F 9/5077 718/1 |
| 2010/0250824 A1 | 9/2010 | Belay |
| 2012/0072633 A1* | 3/2012 | Elboim ............. G06F 13/4081 710/302 |
| 2014/0068607 A1 | 3/2014 | Tsirkin et al. |
| 2015/0149677 A1* | 5/2015 | Zhang ............... G06F 13/4081 710/302 |
| 2016/0170816 A1* | 6/2016 | Warkentin ............ G06F 9/544 719/320 |

OTHER PUBLICATIONS

Bug 956290—[netkvm] Race Condition on Surprise Removal in XP/2003 Driver, http://bugzilla.redhat.com/show_bug.cgi?id=956290, 4 pages, Apr. 24, 2013.

* cited by examiner

USING CAPABILITY INDICATORS TO INDICATE SUPPORT FOR GUEST DRIVEN SURPRISE REMOVAL OF VIRTUAL PCI DEVICES

TECHNICAL FIELD

The present disclosure is generally related to computer systems, and more particularly, to managing surprise removal of devices in virtualized computer systems.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine," and the operating system (OS) of the host machine is typically referred to as the "host operating system." Typically, software on the host machine known as a "hypervisor" (or a "virtual machine monitor") manages the execution of one or more virtual machines or "guests", providing a variety of functions such as virtualizing and allocating resources, context switching among virtual machines, etc. The operating system (OS) of the virtual machine is typically referred to as the "guest operating system."

In a virtualized environment, physical devices, such as network devices or video cards, can be made available to guests by the hypervisor by a process known as device assignment. The hypervisor can create a virtual device within the guest that is associated with the physical device so that any access of the virtual device can be forwarded to the physical device by the hypervisor with little or no modification. Removal of a device from an assigned guest OS without warning (e.g., by simply unplugging it without using a device manager or removal utility), is referred to as "surprise removal."

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
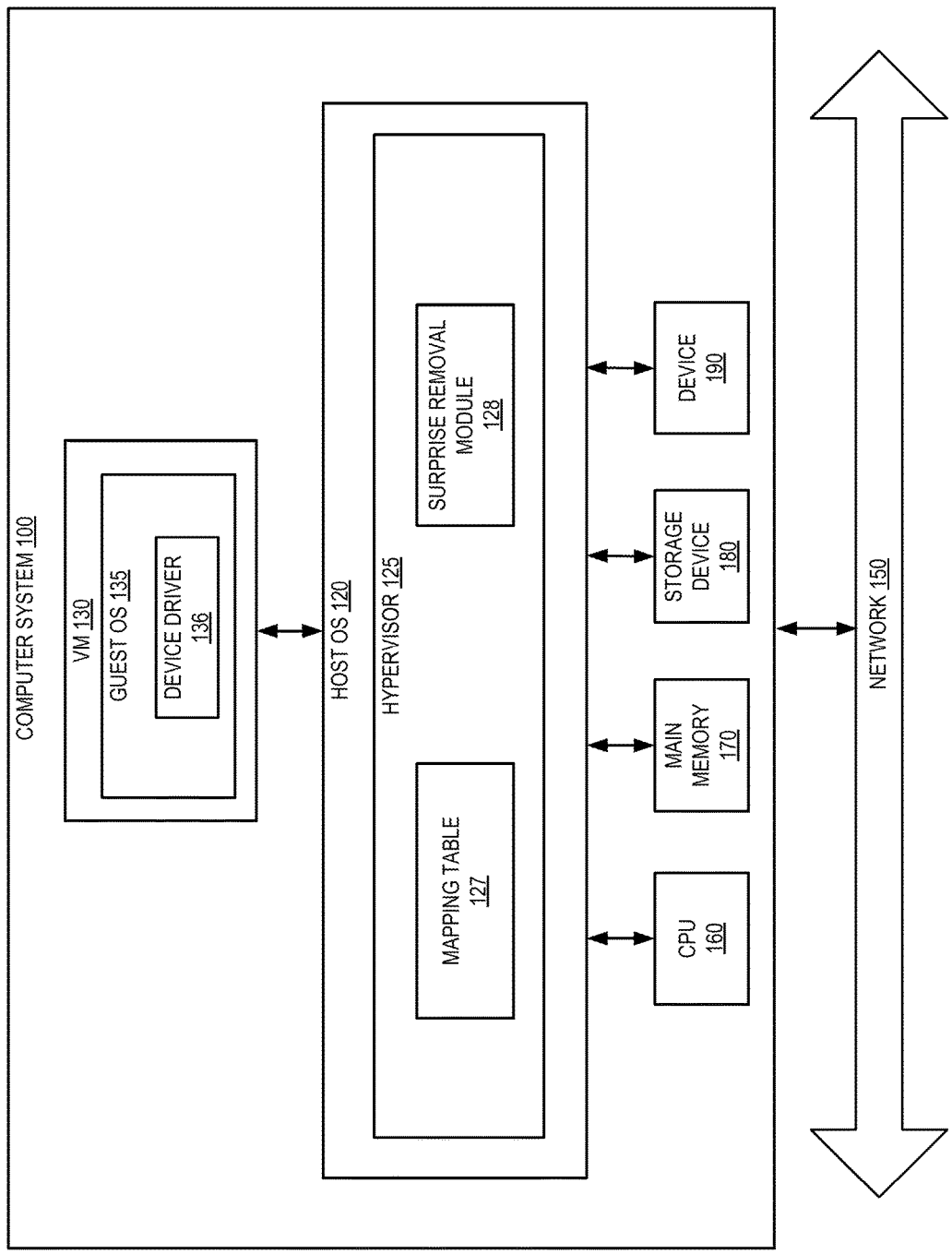
FIG. 1 depicts a high-level component diagram of an example computer system architecture, in accordance with one or more aspects of the present disclosure.

Described herein are methods and systems for guest-driven surprise removal for virtual devices. In a virtualized environment, removal of a virtual device from a host computer system can sometimes occur for reasons of reliability (due to guest OS or host OS instability) or resource over-commit (e.g., a host OS is short on resources consumed by the guest OS) to free resources for use by different virtual machines or hosts. Typically, removal of a virtual device (such as a Peripheral Component Interconnect (PCI) device) from a VM involves sending a removal notification from the hypervisor to the guest OS of the VM and receiving an explicit acknowledgment from the guest OS that indicates that the guest OS has entered a state in which it is safe to remove the device. The acknowledgment from the guest OS is needed to avoid guest OS errors as a result of the device removal prior to the guest OS (also referred to herein as "guest") flushing any associated cache to avoid losing data. For example, the removal of a disk could result in the loss of critical data, or the removal of a network interface controller could result in the loss of networking communication packet information. However, this removal process may be time consuming, particularly if the guest is slow, the guest is not operating properly, or if the guest lacks the ability to recover from a surprise removal of a device.

Aspects of the present disclosure address the above noted and other deficiencies by implementing guest-driven surprise removal for virtual devices. The guest OS can pre-emptively notify the hypervisor during guest boot or device assignment whether surprise removal is supported for a virtual device, effectively sending the removal acknowledgment prior to device removal. Doing so can inform the hypervisor that the guest OS can recover from a surprise removal, allowing the hypervisor to unmap a virtual device from a guest OS without an acknowledgment from the guest OS. This can significantly reduce the time required to complete a device removal, providing the ability to quickly move devices between VMs.

In an illustrative example, a hypervisor can receive a notification from a guest operating system (OS) of a virtual machine that indicates the support provided by a virtual device driver for recovering from a surprise removal (e.g., removal of a virtual device from the guest OS without warning) of a corresponding virtual device from the virtual machine. In some implementations, the notification from the guest OS may include a capability indicator value that corresponds to the level of support for surprise removal of a virtual device provided by the corresponding virtual device driver. The capability indicator value may be numeric (e.g., "1", "2", "3", etc.), alphanumeric (e.g., "A", "B", "C", etc.), a string value (e.g., "safe", "supported", "not safe", etc.), or the like. In some implementations, each of the possible capability indicator values may be stored in association with a corresponding set of one or more actions to be performed for virtual device removal. The capability indicator values may be stored in hypervisor accessible memory, a shared memory space, stored in a storage device, incorporated into executable code, or in any similar manner.

The hypervisor can associate a physical device with a guest operating system by creating a virtual device that is accessible by the guest, where the virtual device is associated with the physical device (e.g., device assignment). Any access of the virtual device by the guest operating system of the virtual machine can be forwarded to the physical device by the hypervisor with little or no modification. In certain implementations, the physical device may be a Peripheral Component Interconnect (PCI) device (e.g., a network interface controller (NIC), an Integrated Graphics Device (IGD), etc.).

The guest operating system may determine the capability indicator value that identifies the support provided by the virtual device driver for recovering from surprise removal of the virtual device from the VM when the guest detects the assignment of the virtual device to the VM. For example, the guest may determine the capability indicator value at guest boot time (e.g., when the guest begins execution). Alternatively, the guest may determine the capability indicator value when a new device is detected by the guest during guest execution. In some implementations, the guest may determine the capability indicator value using the virtual device driver for the device. For example, upon detecting a virtual device, the guest may locate the virtual device driver for the device and examine a property of the virtual device driver to determine whether the device supports surprise removal recovery. The guest may complete this determination on a device-by-device basis, or alternatively, may make a single determination for all assigned devices.

In some implementations, the guest may determine whether or not surprise removal is supported by the virtual device driver. Alternatively, the guest may conduct a more advanced determination to accommodate different levels of support. In in illustrative example, support levels can include "safe," "supported," and "not safe." Surprise removal may be deemed "safe" when the guest can completely recover from surprise removal of the virtual device. Surprise removal may be deemed "supported" when the surprise removal of a virtual device may not result in an abnormal termination (crash) of the guest, but graceful removal (e.g., the hypervisor should wait for acknowledgment from the guest before removal of the device) is preferred. Surprise removal may be deemed "not safe" when surprise removal of the virtual device will result in an abnormal termination (crash) of the guest, so the hypervisor should wait for acknowledgment from the guest prior to removal of the device (graceful removal). It should be noted that although, for simplicity, only three surprise removal recovery capability levels have been described above, in some other implementations more or fewer levels may be included.

Once the guest has determined the level of surprise removal recovery supported by the virtual device driver, the guest may set the capability indicator value that corresponds with the level of support. In some implementations, the guest may store and maintain this information in a data structure accessible to the guest. The data structure may be maintained in guest accessible memory, a shared memory space, stored in a storage device, or in any similar manner. The guest may subsequently send the notification to the hypervisor that includes the capability indicator value. The guest may send the notification via an interrupt request, a message written to a data structure in a shared memory location, or in any similar manner. The guest may send a separate notification for each individual device, a single notification for all devices that are of a similar device type (e.g., one notification for all PCI devices, one notification for all USB devices, one notification for all NICs, etc.), a single global notification for all devices assigned to the guest, or in any other manner.

The hypervisor, upon receipt of the notification, may store the capability indicator value received from the guest OS to a mapping table in association with the virtual machine and virtual device. The mapping table may contain the capability indicator value, an identifier for the virtual machine executing the guest operating system (e.g., the process identifier for the VM), a unique identifier for the virtual device, the device type, or any similar information. The mapping table may be maintained in hypervisor accessible memory, a shared memory space, stored in a storage device, or in any similar manner.

Subsequently, the hypervisor may receive a request to remove the virtual device from the VM. In some implementations, the request may be received from a hypervisor administrator via a management system interface for the hypervisor. Alternatively, the request may be received from another component of the system. The hypervisor, upon receipt of the request, may access the mapping table to obtain the capability indicator of support provided by the virtual device driver for recovering from a surprise removal of the virtual device from the virtual machine. In an illustrative example, a hypervisor administrator may need to quickly move a high performance network interface controller from an executing source virtual machine to an executing destination virtual machine, and may send the request to the hypervisor via a management system interface console. The hypervisor may then access the mapping table using the identifier of the source virtual machine (e.g., the process id) to determine the capability indicator value of the virtual device driver associated with network interface controller that was sent to the hypervisor by the source virtual machine as noted above. If the hypervisor is unable to determine the capability indicator value of the virtual device driver (e.g., the capability indicator value is not present in the mapping table), the hypervisor may deny the removal request. In some implementations, the hypervisor may then send a notification of the denial to the requestor. The hypervisor may send the notification via an interrupt request, a message written to a data structure in a shared memory location, or in any similar manner.

The hypervisor may use the capability indicator value from mapping table to identify a list of one or more actions to be performed to remove the virtual device from the VM. The hypervisor may then remove the virtual device from the VM using the one or more actions. If, according to the contents of the mapping table, the capability indicator value indicates that surprise removal of the virtual device is "safe" (e.g., the guest can completely recover from surprise removal of the device), the hypervisor may unmap the virtual device from the guest immediately without waiting for an acknowledgment. Unmapping a device from the guest includes modifying hypervisor data structures (e.g., PCI forwarding tables, CPU memory tables, etc.) such that future accesses to one of the resources assigned to a virtual device are no longer forwarded to the physical device. Unmapping the device from the guest should be sufficient to allow the hypervisor to reuse the device (e.g., assign the device to another virtual machine). After unmapping the device from the guest, the hypervisor may then send a notification to the guest indicating that the device has been removed from the guest by the hypervisor. The hypervisor may send the notification via an interrupt request, a message written to a data structure in a shared memory location, or in any similar manner. Responsive to receiving an acknowledgment from the guest of the notification, the hypervisor may then free resources associated with the virtual device for use (e.g., reusing the resources for a different virtual device of the same virtual machine).

If, according to the contents of the mapping table, the capability indicator value indicates that surprise removal of the virtual device is "supported" (e.g., the surprise removal of a device will not result in an abnormal termination (crash) of the guest, but graceful removal is preferred), the hypervisor may first attempt to remove the device gracefully before attempting a surprise removal. The hypervisor may send a notification to the guest to indicate that the device needs to be removed from the guest. The hypervisor may send this notification via an interrupt request, a message written to a data structure in a shared memory location, or in any similar manner. In some implementations, a timer may be used to determine whether to attempt a surprise removal (e.g., if the guest is malfunctioning, overburdened with requests, etc.). For example, upon sending the notification, the hypervisor may then start a timer associated with the notification. Any time before the timer expires, the guest may return an acknowledgment of the notification to indicate to the hypervisor that graceful removal of the device may continue, at which point the hypervisor may unmap the device and free the resources. However, if the hypervisor detects that the timer has expired prior to receiving an acknowledgment, the hypervisor may attempt a surprise removal of the device (following similar steps described above when the surprise removal capability is deemed "safe").

If the timer has expired, and the hypervisor attempts surprise removal of the device, the hypervisor may first unmap the virtual device from the guest, and send a second notification to the guest indicating that the device has been removed from the guest by the hypervisor. Responsive to receiving an acknowledgment from the guest of this second notification, the hypervisor may then free resources associated with the virtual device for use. In some implementations, the hypervisor may send an alert to an administrator (e.g., to a management system interface for the hypervisor) to request confirmation to unmap the virtual device and subsequently free the hypervisor resources. Upon receiving confirmation from the administrator, the hypervisor may unmap the virtual device and free the resources for use.

If, according to the contents of the mapping table, the capability indicator value indicates that surprise removal of the virtual device is "not safe" (e.g., the surprise removal of the device will result in an abnormal termination (crash) of the guest), the hypervisor should wait for acknowledgment from the guest prior to removal of the device (graceful removal). The hypervisor may first send a notification to the guest to indicate that the device needs to be removed from the guest. The guest may then return an acknowledgment of the notification to indicate to the hypervisor that graceful removal of the device may continue, at which point the hypervisor may unmap the device and free the resources associated with the virtual device.

In some implementations, where the hypervisor receives a removal request for a virtual device but has not received a notification from the guest that indicates the support provided by the corresponding virtual device driver for recovering from the surprise removal of the virtual device (e.g., there is no information in the mapping table for that virtual device/virtual machine association), the hypervisor may default to the process used when surprise removal is "not safe" as noted above. Alternatively, the hypervisor may default to the process used when surprise removal is "supported" (e.g., start a timer). If the hypervisor does not receive any surprise removal capability information from the guest, the hypervisor may instead treat this as an indication that the guest is undergoing the boot process and attempt a surprise removal of the virtual device without requiring a guest acknowledgement (e.g., the hypervisor may assume that the guest has not yet discovered the device, so surprise removal is safe). The hypervisor may also interpret this as an indication that the guest has crashed. Thus, the hypervisor may attempt to stop or reset the virtual machine and remove the device.

Aspects of the present disclosure are thus capable of facilitating guest-driven surprise removal for virtual devices. More particularly, aspects of the present disclosure can reduce the time required to remove a virtual device from a guest OS by determining the level of surprise removal recovery capability for a virtual device driver of a corresponding virtual device assigned to the guest OS prior to removal.

FIG. 1 depicts a high-level component diagram of an illustrative example of a computer system 100, in accordance with one or more aspects of the present disclosure. One skilled in the art will appreciate that other architectures for computer system 100 are possible, and that the implementation of a computer system utilizing examples of the invention are not necessarily limited to the specific architecture depicted by FIG. 1.

As shown in FIG. 1, the computer system 100 is connected to a network 150 and comprises one or more central processing units (CPU) 160, main memory 170, which may include volatile memory devices (e.g., random access memory (RAM)), non-volatile memory devices (e.g., flash memory) and/or other types of memory devices, a storage device 180 (e.g., one or more magnetic hard disk drives, a Peripheral Component Interconnect [PCI] solid state drive, a Redundant Array of Independent Disks [RAID] system, a network attached storage [NAS] array, etc.), and one or more devices 190 (e.g., a Peripheral Component Interconnect [PCI] device, network interface controller (NIC), a video card, an I/O device, etc.). In certain implementations, main memory 170 may be non-uniform access (NUMA), such that memory access time depends on the memory location relative to CPU 160. It should be noted that although, for simplicity, a single CPU 160, storage device 180, and device 190 are depicted in FIG. 1, other embodiments of computer system 100 may comprise a plurality of CPUs, storage devices, and devices.

The computer system 100 may be a server, a mainframe, a workstation, a personal computer (PC), a mobile phone, a palm-sized computing device, etc. The network 150 may be a private network (e.g., a local area network (LAN), a wide area network (WAN), intranet, etc.) or a public network (e.g., the Internet).

Computer system 100 may additionally comprise one or more virtual machine (VM) 130 and host operating system (OS) 120. VM 130 is a software implementation of a machine that executes programs as though it was an actual physical machine. Host OS 120 manages the hardware resources of the computer system and provides functions such as inter-process communication, scheduling, memory management, and so forth.

VM 130 may comprise a guest operating system (OS) 135 that handles the execution of applications within the virtual machine. Guest OS 135 may control a device 190 through device driver 136. Guest OS 135 may additionally determine the surprise removal recovery capability of the device 190 using the device driver 136. Guest OS 135 may determine the surprise removal recovery capability of device 190 when the guest detects the assignment of the device 190 to the guest. For example, guest OS 135 may determine the surprise removal recovery capability of device 190 at guest OS 135 boot time (e.g., when guest OS 135 begins execution). Alternatively, guest OS 135 may determine the surprise removal recovery capability of a virtual device when device 190 is detected by guest OS 135 during execution. For example, upon detecting the device 190, the guest OS 135 may locate the device driver 136 and examine a property of the device driver 136 to determine whether device 190 supports surprise removal recovery. It should be noted that although, for simplicity, a single VM 130 is depicted in FIG. 1, computer system 100 may host a plurality VMs 130.

Host OS 120 may comprise a hypervisor 125, which provides a virtual operating platform for VMs 130 and manages their execution. Hypervisor 125 may comprise mapping table 127 and surprise removal module 128. It should be noted that in some alternative implementations, hypervisor 125 may be external to host OS 120, rather than embedded within host OS 120, or may replace host OS 120.

Surprise removal module 128 can facilitate guest driven surprise removal for devices 190, as described in detail below with respect to FIGS. 3-7. Surprise removal module 128 may save the capability indicator value associated with the support provided by virtual device driver 136 for recovering from surprise removal of the virtual device associated with device 190 received from VM 130 in mapping table 127. Mapping table 127 may contain an identifier for VM 130 executing guest OS 135, an identifier for device 190, the device type, the capability indicator value, or any similar information. Mapping table 127 can be an area of hypervisor memory accessible to surprise removal module 128, a shared memory space, a data structure saved in storage device 180, or the like.

Figure 2:
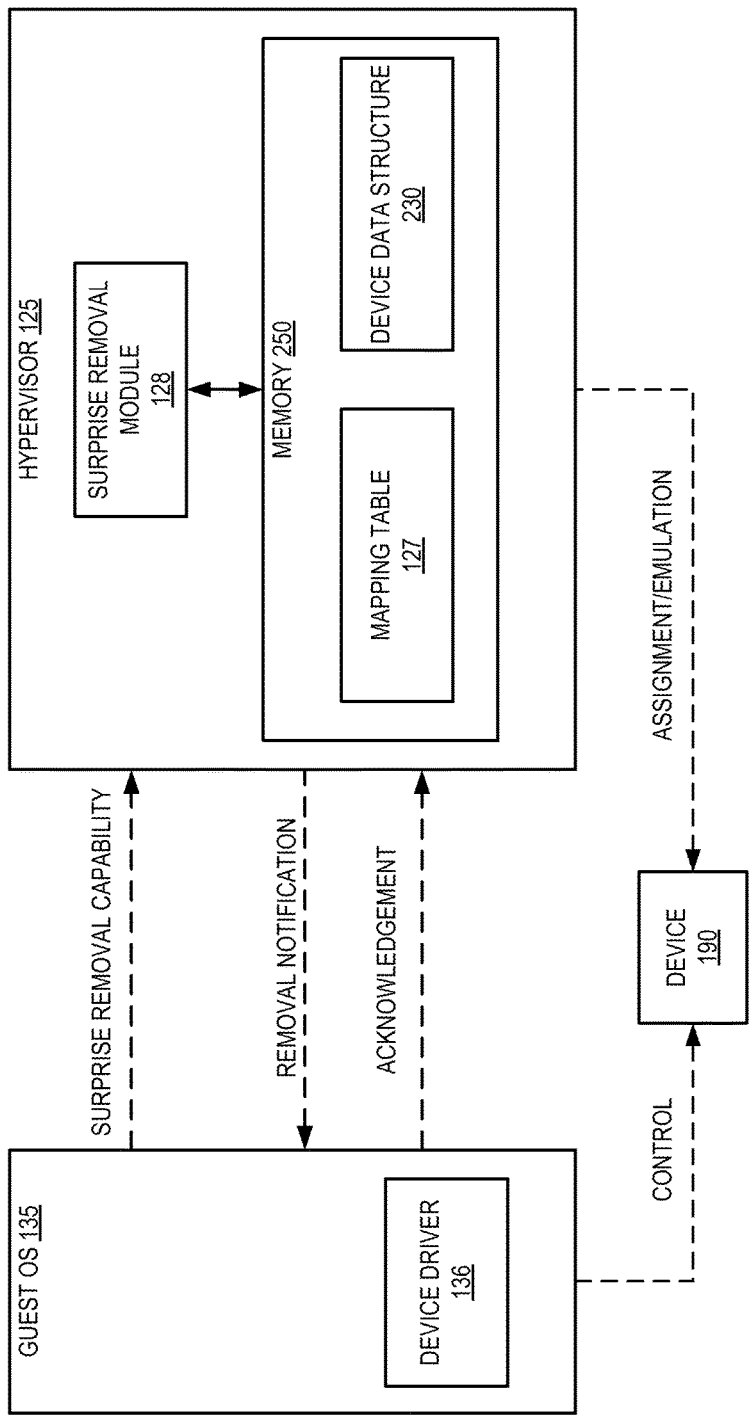
FIG. 2 depicts example of an interaction between a hypervisor and guest OS, from which a device is to be removed, in accordance with one or more aspects of the present disclosure.

FIG. 2 illustrates an example of an interaction between the hypervisor 125 and the guest OS 135, from which the device 190 is to be removed. The device 190 may be a physical device assigned by the hypervisor 125 to the guest OS 135, or a virtual device that is emulated by the hypervisor 125 for the guest OS 135. The hypervisor 125 may maintain a device data structure 230 in data storage (e.g., memory 250) that is allocated to the guest OS 135 for the use of the device 190. The device data structure 230 is accessible to the surprise removal module 128, and may be used for emulation of the device 190, for mediating the guest's access to the device 190, and/or for other device management purposes. The guest OS 135 may control the device 190 through a device driver 136.

In an illustrative example, guest OS 135 may determine the level of surprise removal recovery supported by device driver 136 when the guest detects assignment of device 190 (e.g., at boot time, during guest execution, etc.). Guest OS 135 may determine the capability indicator value that identifies the support provided by the device driver 136 for recovering from surprise removal of device 190 from the VM using a property of device driver 136. Guest OS 135 may then send the capability indicator value to hypervisor 125. Surprise removal module 128 of hypervisor 125 can receive this information from guest OS 135 and save it in mapping table 127. Subsequently, surprise removal module 128 may receive a request to remove device 190 from guest OS 135 (e.g., from a hypervisor administrator via a management system interface for the hypervisor). Surprise removal module 128 may then access mapping table 127 to determine the capability indicator value from guest OS 135, identify a list of one or more actions to perform to remove device 190 from guest OS 135, and subsequently attempt to remove device 190 from guest OS 135 using the one or more actions.

If, according to the contents of mapping table 127, surprise removal of the device is "safe" (e.g., the guest can completely recover from surprise removal of the device), the surprise removal module 128 may unmap device 190 from guest OS 135 immediately without waiting for an acknowledgment. After unmapping device 190 from guest OS 135, surprise removal module 128 may then send a notification to guest OS 135 indicating that device 190 has been removed. Responsive to receiving an acknowledgment from guest OS 135 of the notification, surprise removal module 128 may then free resources associated with device 190 for use. It should be noted that in some alternative implementations, surprise removal module 128 may support additional levels of surprise removal capability to those depicted in FIG. 2, as described in detail below with respect to FIGS. 3-6.

Figure 3:
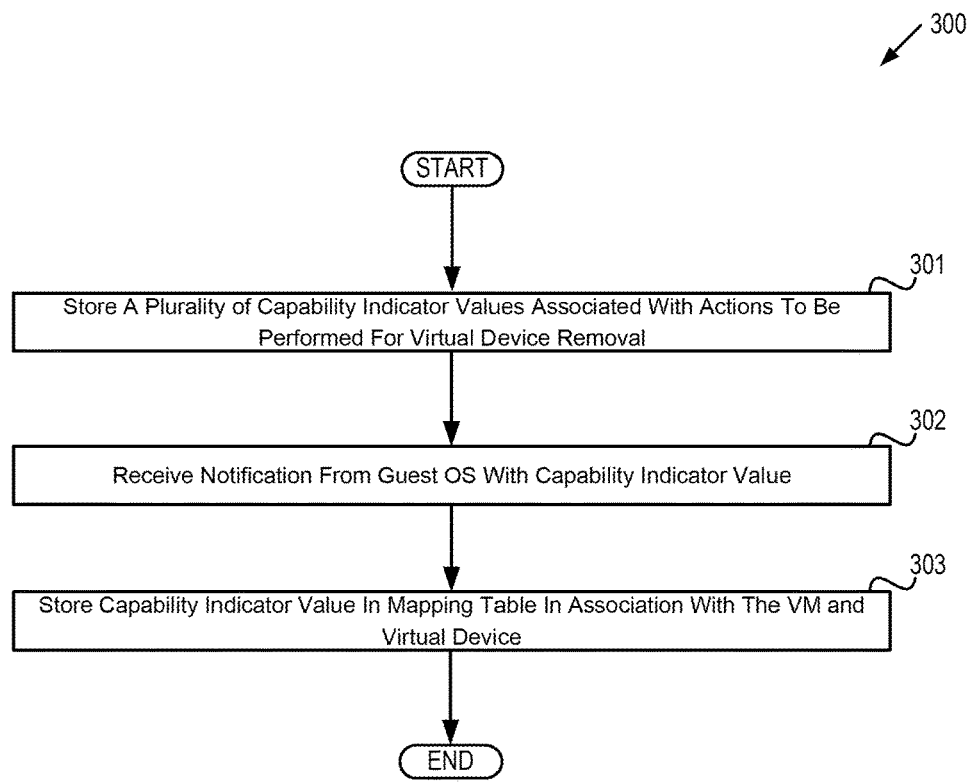
FIG. 3 depicts a flow diagram of a method for managing surprise removal actions for virtual devices, in accordance with one or more aspects of the present disclosure.

FIG. 3 depicts a flow diagram of an example method 300 for managing surprise removal actions for virtual devices. The method may be performed by processing logic that may comprise hardware (circuitry, dedicated logic, etc.), software (such as is run on a general purpose computer system or a dedicated machine), or a combination of both. In one illustrative example, method 300 may be performed by surprise removal module 128 of hypervisor 125 in FIG. 1. Alternatively, some or all of method 300 might be performed by another module or machine. It should be noted that blocks depicted in FIG. 3 could be performed simultaneously or in a different order than that depicted.

At block 301, processing logic can store a plurality of capability indicator values, each associated with a corresponding set of one or more actions to be performed for virtual device removal. The capability indicator values may be numeric (e.g., "1", "2", "3", etc.), alphanumeric (e.g., "A", "B", "C", etc.), string values (e.g., "safe", "supported", "not safe", etc.), or the like. The capability indicator values may be stored in hypervisor accessible memory, a shared memory space, stored in a storage device, incorporated into executable code, or in any similar manner. In some implementations, the actions to be performed for virtual device removal may be those as described below with respect to FIGS. 5-7.

At block 302, processing logic can receive a notification from a guest OS of a VM that includes a capability indicator value associated with the support provided by a virtual device driver for recovering from surprise removal of an associated virtual device from the VM. In some implementations, the capability indicator value received in the notification may be one of the indicator values stored in block 301.

At block 303, processing logic can store the capability indicator value in a mapping table in association with the virtual machine and the virtual device. The mapping table may contain the capability indicator value, an identifier for the virtual machine executing the guest operating system (e.g., the process identifier for the VM), a unique identifier for the virtual device, the device type, or any similar information. The mapping table may be maintained in hypervisor accessible memory, a shared memory space, stored in a storage device, or in any similar manner. After block 303, the method of FIG. 3 terminates.

Figure 4:
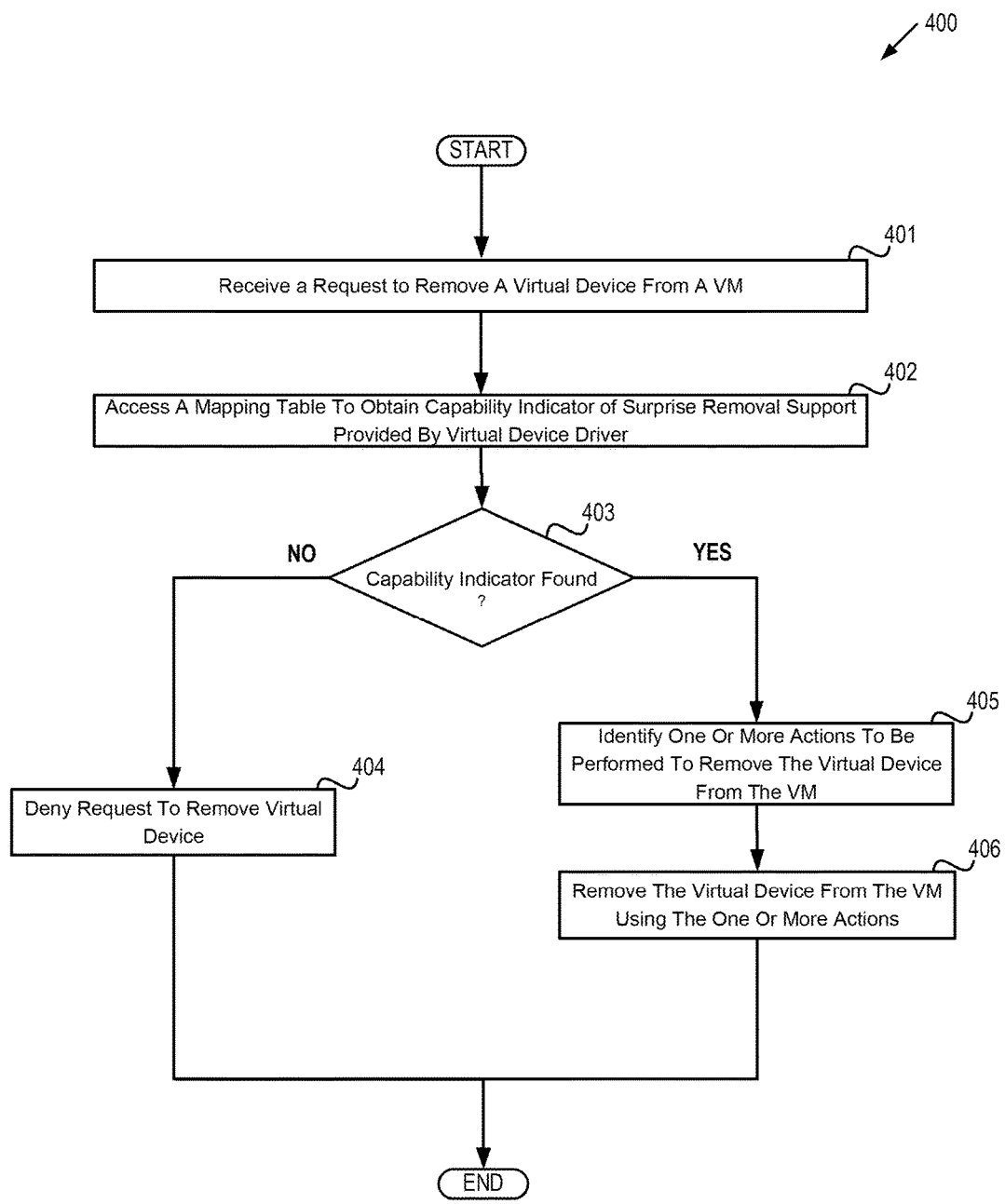
FIG. 4 depicts a flow diagram of a method for guest-driven surprise removal for virtual devices, in accordance with one or more aspects of the present disclosure

FIG. 4 depicts a flow diagram of an example method 400 for guest-driven surprise removal for virtual devices. The method may be performed by processing logic that may comprise hardware (circuitry, dedicated logic, etc.), software (such as is run on a general purpose computer system or a dedicated machine), or a combination of both. In one illustrative example, method 400 may be performed by surprise removal module 128 of hypervisor 125 in FIG. 1. Alternatively, some or all of method 400 might be performed by another module or machine. It should be noted that blocks depicted in FIG. 4 could be performed simultaneously or in a different order than that depicted.

At block 401, processing logic can receive a request to remove a virtual device from a VM. In some implementations, the request may be received from a hypervisor administrator via a management system interface for the hypervisor. Alternatively, the request may be received from another component of the system. At block 402, processing logic can access a mapping table to obtain a capability indicator of surprise removal support provided by the virtual device driver associated with the virtual device for recovering from a surprise removal of the virtual device from the VM.

At block 403, processing logic can determine whether the capability indicator is found in the mapping table. If not, processing proceeds to block 404. At block 404, processing logic can deny the request to remove the virtual device. In some implementations, processing logic may send a notification to the requestor of the denial. The hypervisor may send the notification via an interrupt request, a message written to a data structure in a shared memory location, or in any similar manner. After block 404, the method of FIG. 4 terminates.

Figure 5:
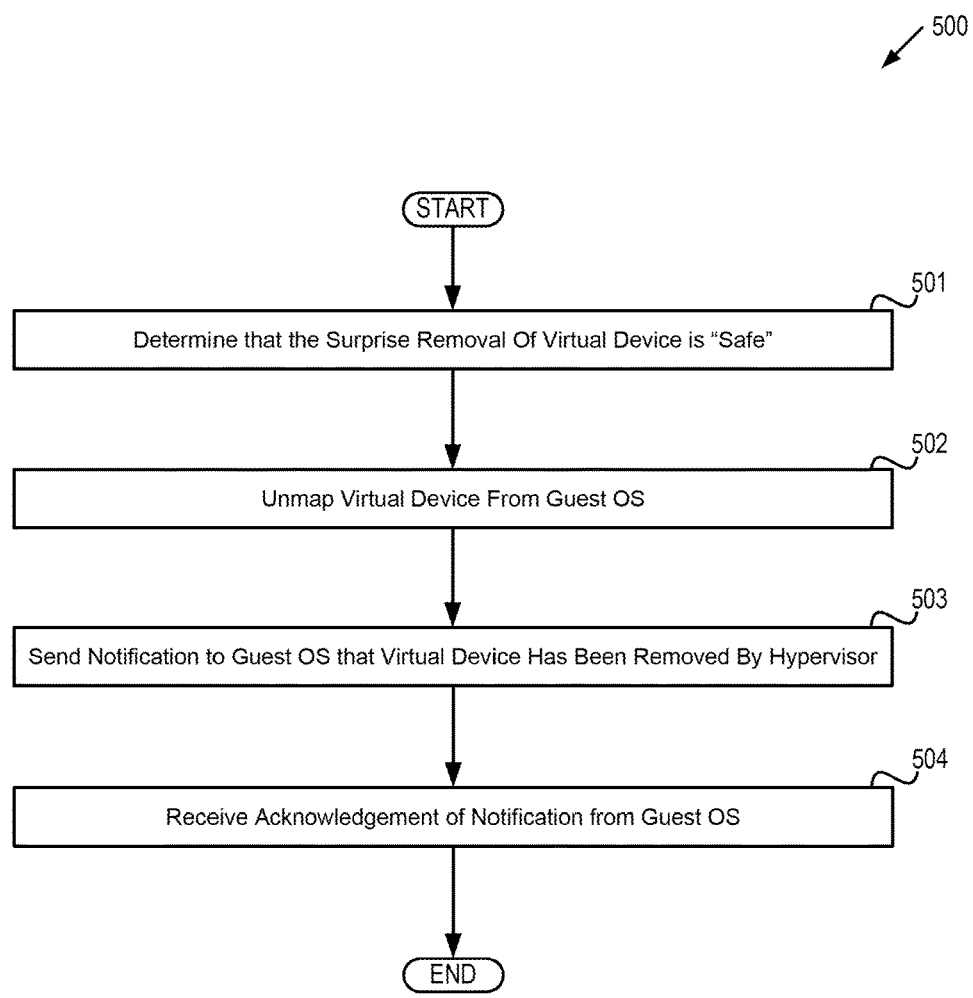
FIG. 5 depicts a flow diagram of a method for device removal where surprise removal is "safe", in accordance with one or more aspects of the present disclosure.

If, at block 403, processing logic determines that the capability indicator is found in the mapping table, processing continues to block 405. At block 405, processing logic can identify one or more actions to be performed to remove the virtual device from the VM. In some implementations, the actions to be performed for virtual device removal may be those stored in block 301 of FIG. 3. Additionally, or alternatively, the actions to be performed may be those as described below with respect to FIGS. 5-7. At block 406, processing logic can remove the virtual device from the VM using the one or more actions. After block 406, the method of FIG. 4 terminates FIG. 5 depicts a flow diagram of an example method 500 for device removal where surprise removal is "safe". The method may be performed by processing logic that may comprise hardware (circuitry, dedicated logic, etc.), software (such as is run on a general purpose computer system or a dedicated machine), or a combination of both. In one illustrative example, method 500 may be performed by surprise removal module 128 of hypervisor 125 in FIG. 1. Alternatively, some or all of method 500 might be performed by another module or machine. It should be noted that blocks depicted in FIG. 5 could be performed simultaneously or in a different order than that depicted.

At block 501, processing logic can determine that surprise removal of a virtual device is "safe" (e.g., the guest can completely recover from surprise removal of the device). In some implementations, this determination can be made by the processing logic at block 402 of FIG. 4, and blocks 502-504 below may be the actions identified by the processing logic at block 403 of FIG. 4, and subsequently performed by block 404 of FIG. 4.

At block 502, processing logic can unmap the device from the guest OS. Since surprise removal was determined to be "safe" at block 501, processing logic may unmap the virtual device from the guest OS immediately without waiting for an acknowledgment. Unmapping a device from the guest can include modifying hypervisor data structures (e.g., PCI forwarding tables, CPU memory tables, etc.) such that future accesses to one of the resources assigned to a virtual device are no longer forwarded to the physical device. Unmapping the device from the guest should be sufficient to allow processing logic to reuse the device (e.g., assign the device to another virtual machine).

At block 503, processing logic can send a notification to the guest OS indicating that the device has been removed from the guest OS. Processing logic may send the notification via an interrupt request, a message written to a data structure in a shared memory location, or in any similar manner. At block 504, processing logic can receive an acknowledgment of the notification from the guest OS. At block 505, processing logic can free hypervisor resources associated with the device responsive to receiving the acknowledgment (e.g., reuse the resources for a different virtual device of the same virtual machine). After block 505, the method of FIG. 5 terminates.

Figure 6:
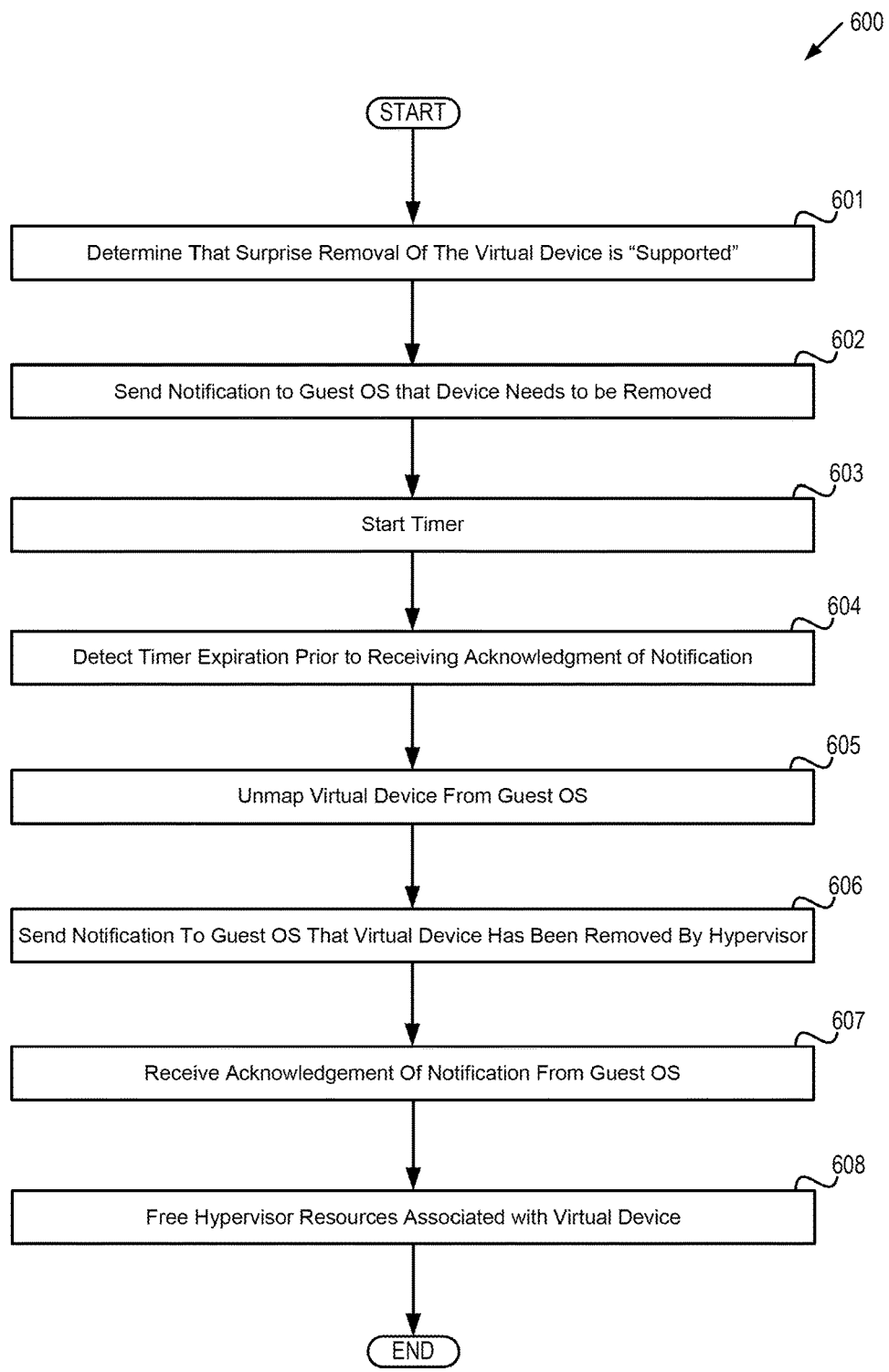
FIG. 6 depicts a flow diagram of a method for device removal where surprise removal is "supported", in accordance with one or more aspects of the present disclosure.

FIG. 6 depicts a flow diagram of an example method 600 for device removal where surprise removal is "supported". The method may be performed by processing logic that may comprise hardware (circuitry, dedicated logic, etc.), software (such as is run on a general purpose computer system or a dedicated machine), or a combination of both. In one illustrative example, method 600 may be performed by surprise removal module 128 of hypervisor 125 in FIG. 1. Alternatively, some or all of method 600 might be performed by another module or machine. It should be noted that blocks depicted in FIG. 6 could be performed simultaneously or in a different order than that depicted.

At block 601, processing logic can determine that the surprise removal recovery capability of a device is "supported" (e.g., the surprise removal of a device will not result in an abnormal termination (crash) of the guest, but graceful removal is preferred). In some implementations, this determination can be made by the processing logic at block 402 of FIG. 4, and blocks 602-508 below may be the actions identified by the processing logic at block 403 of FIG. 4, and subsequently performed by block 404 of FIG. 4.

At block 602, processing logic can send a notification to the guest OS that the device needs to be removed from the guest OS (e.g., graceful removal). Processing logic may send this notification via an interrupt request, a message written to a data structure in a shared memory location, or in any similar manner.

At block 603, processing logic can start a timer to determine whether to attempt a surprise removal (e.g., if the guest is malfunctioning, overburdened with requests, etc.). For example, processing logic may then start a timer associated with the notification sent at block 602. Any time before the timer expires, the guest OS may return an acknowledgment of the notification sent at block 602 to indicate that graceful removal of the device may continue, at which point processing logic may unmap the device and free the resources. At block 604, processing logic can detect timer expiration prior to receiving an acknowledgment of the notification from the guest OS.

At block 605, processing logic can unmap the device from the guest OS. Unmapping a device from the guest includes modifying hypervisor data structures (e.g., PCI forwarding tables, CPU memory tables, etc.) such that future accesses to one of the resources assigned to a virtual device are no longer forwarded to the physical device. Unmapping the device from the guest should be sufficient to allow processing logic to reuse the device (e.g., assign the device to another virtual machine).

At block 606, processing logic can send a notification to the guest OS that the device has been removed by the hypervisor. Processing logic may send the notification via an interrupt request, a message written to a data structure in a shared memory location, or in any similar manner. At block 607, processing logic can receive an acknowledgment of the notification from the guest OS. At block 608, processing logic can free hypervisor resources associated with the device (e.g., reuse the resources for a different virtual device of the same virtual machine). After block 608, the method of FIG. 6 terminates.

Figure 7:
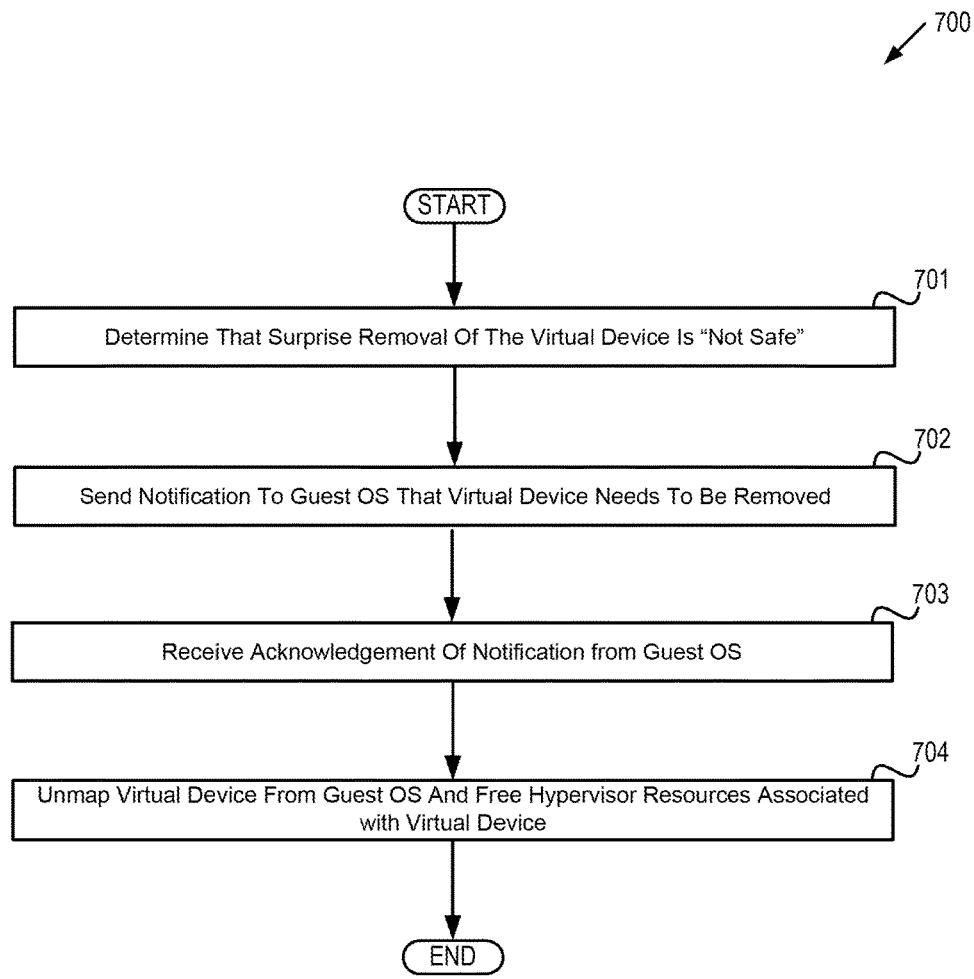
FIG. 7 depicts a flow diagram of a method for device removal where surprise removal is "not safe", in accordance with one or more aspects of the present disclosure.

FIG. 7 depicts a flow diagram of an example method 700 for device removal where surprise removal is "not safe". The method may be performed by processing logic that may comprise hardware (circuitry, dedicated logic, etc.), software (such as is run on a general purpose computer system or a dedicated machine), or a combination of both. In one illustrative example, method 700 may be performed by surprise removal module 128 of hypervisor 125 in FIG. 1. Alternatively, some or all of method 700 might be performed by another module or machine. It should be noted that blocks depicted in FIG. 7 could be performed simultaneously or in a different order than that depicted.

At block 701, processing logic can determine that the surprise removal recovery capability of a device is "not safe" (e.g., the surprise removal of the device will result in an abnormal termination (crash) of the guest). In some implementations, this determination can be made by the processing logic at block 402 of FIG. 4, and blocks 702-704 below may be the actions identified by the processing logic at block 403 of FIG. 4, and subsequently performed by block 404 of FIG. 4.

At block 702, processing logic can send a notification to the guest OS that the device needs to be removed from the guest OS (e.g., graceful removal). Processing logic may send this notification via an interrupt request, a message written to a data structure in a shared memory location, or in any similar manner. At block 703, processing logic can receive an acknowledgment of the notification from the guest OS. At block 704, processing logic can unmap the device from the guest OS and free hypervisor resources associated with the device. Unmapping a device from the guest includes modifying hypervisor data structures (e.g., PCI forwarding tables, CPU memory tables, etc.) such that future accesses to one of the resources assigned to a virtual device are no longer forwarded to the physical device. Unmapping the device from the guest should be sufficient to allow processing logic to reuse the device (e.g., assign the device to another virtual machine). Freeing hypervisor resources can permit reuse of the resources for a different virtual device of the same virtual machine. After block 704, the method of FIG. 7 terminates.

Figure 8:
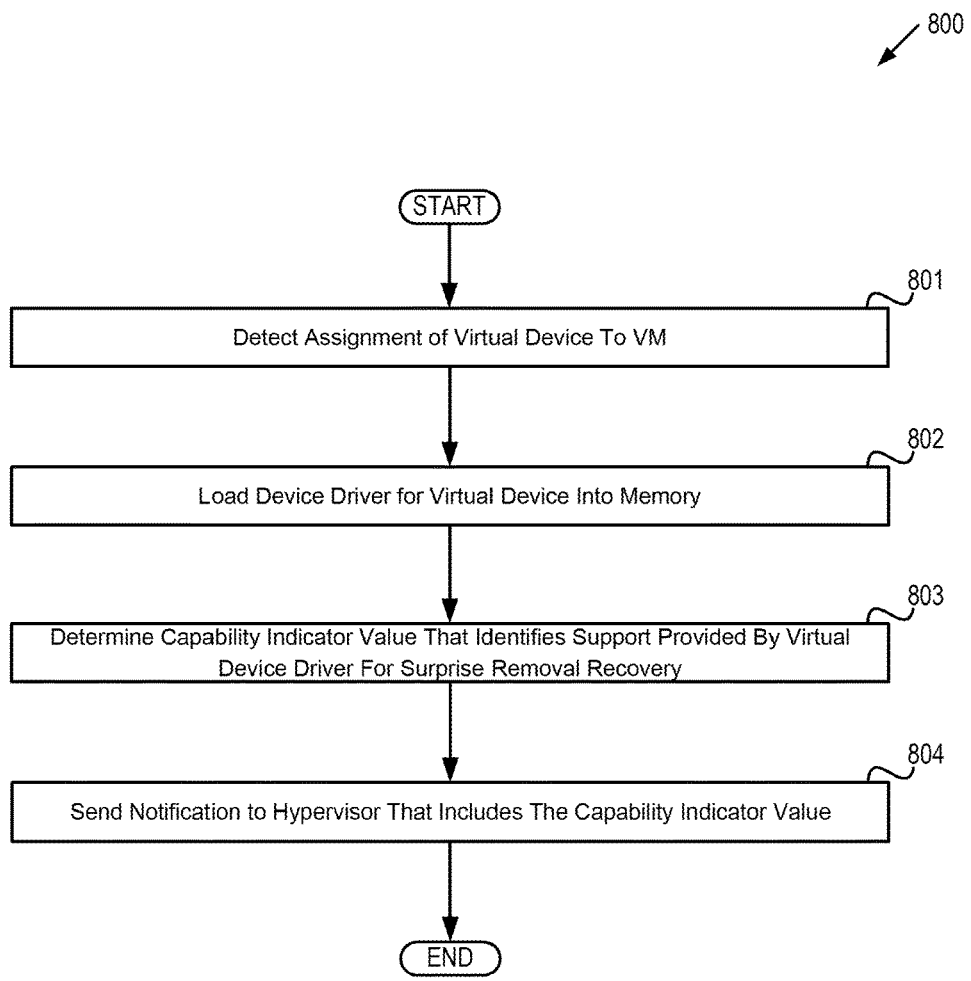
FIG. 8 depicts a flow diagram of a method for determining surprise removal recovery capability of a device by a guest OS, in accordance with one or more aspects of the present disclosure.

FIG. 8 depicts a flow diagram of an example method 800 for determining surprise removal recovery capability of a device by a guest OS. The method may be performed by processing logic that may comprise hardware (circuitry, dedicated logic, etc.), software (such as is run on a general purpose computer system or a dedicated machine), or a combination of both. In one illustrative example, method 800 may be performed by guest OS 135 of VM 130 in FIG. 1. Alternatively, some or all of method 800 might be performed by another module or machine. It should be noted that blocks depicted in FIG. 8 could be performed simultaneously or in a different order than that depicted.

At block 801, processing logic can detect assignment of a device to a VM. Processing logic may detect device assignment during the boot process of the guest OS. Alternatively, processing logic may detect device assignment when a new device is detected during guest OS execution (after the boot process has completed). At block 802, processing logic can load a device driver for the virtual device into memory.

At block 803, processing logic can determine a capability indicator value that identifies the support provided by the virtual device driver loaded at block 802 for surprise removal recovery of the associated virtual device. Processing logic may examine a property of the device driver to determine whether the device supports surprise removal recovery. Processing logic may complete this determination on a device-by-device basis, or alternatively, may make a single determination for all assigned devices.

In some implementations, processing logic may determine whether or not surprise removal is supported by the device. Alternatively, processing logic may conduct a more advanced determination to accommodate different levels of support. In in illustrative example, support levels can include "safe," "supported," and "not safe." Surprise removal may be deemed "safe" when the guest can completely recover from surprise removal of the device. Surprise removal may be deemed "supported" when the surprise removal of a device will not result in an abnormal termination (crash) of the guest, but graceful removal (e.g., the hypervisor should wait for acknowledgment from the guest before removal of the device) is preferred. Surprise removal may be deemed "not safe" when surprise removal of the device will result in an abnormal termination (crash) of the guest, so the hypervisor should wait for acknowledgment from the guest prior to removal of the device (graceful removal). It should be noted that although, for simplicity, only three surprise removal recovery capability levels have been described, in some other implementations more or fewer levels may be included.

At block 804, processing logic can send a notification to the hypervisor that includes the capability indicator value determined at block 803. Processing logic may send this notification via an interrupt request, a message written to a data structure in a shared memory location, or in any similar manner. After block 804, the method of FIG. 8 terminates.

Figure 9:
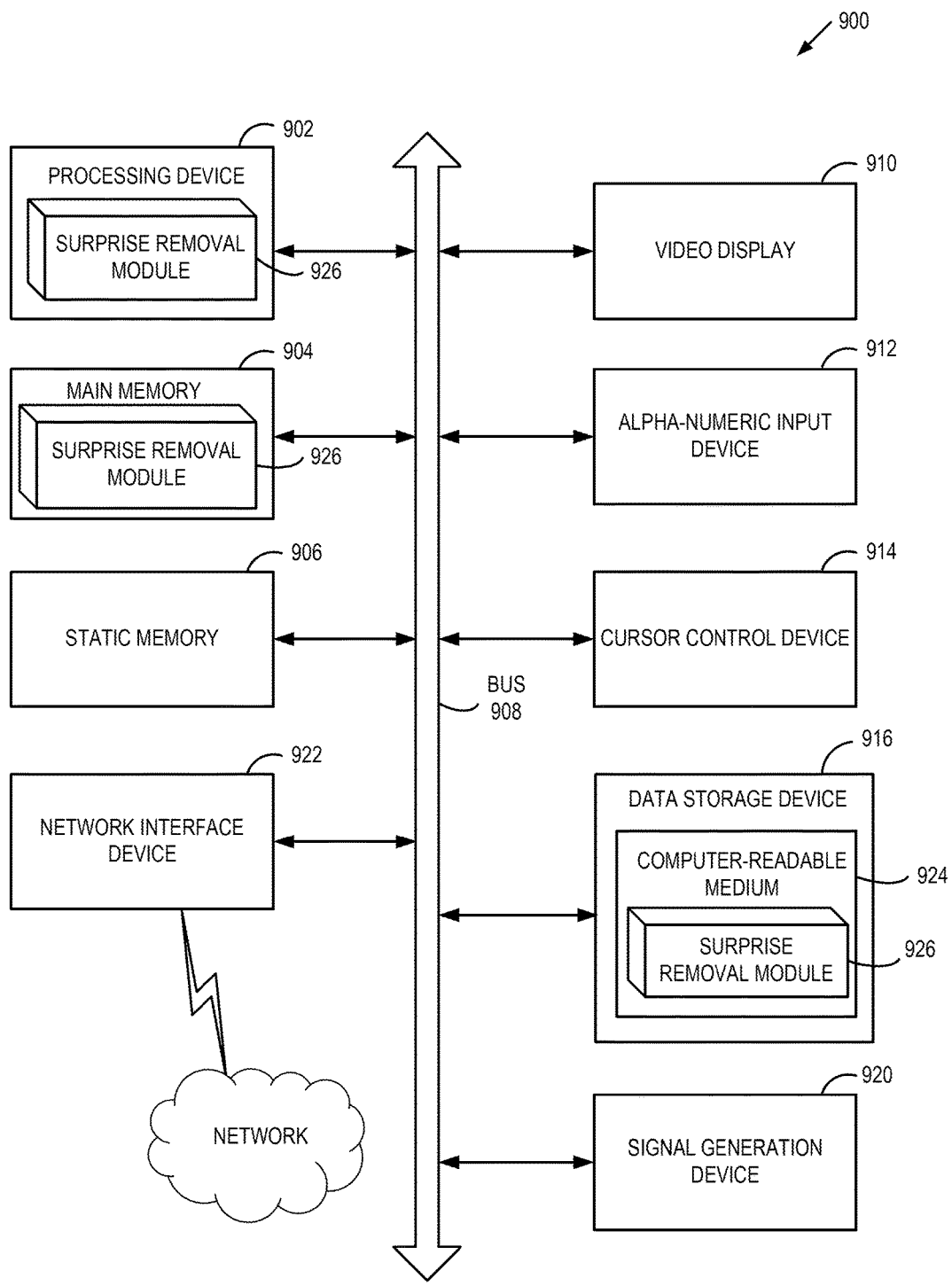
FIG. 9 depicts a block diagram of an illustrative computer system operating in accordance with examples of the invention.

FIG. 9 depicts an example computer system 900 which can perform any one or more of the methods described herein. In one example, computer system 900 may correspond to computer system 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 900 includes a processing device 902, a main memory 904 (e.g., read-only memory (ROM), flash memory, dynamic random access memory (DRAM) such as synchronous DRAM (SDRAM)), a static memory 906 (e.g., flash memory, static random access memory (SRAM)), and a data storage device 916, which communicate with each other via a bus 908.

Processing device 902 represents one or more general-purpose processing devices such as a microprocessor, central processing unit, or the like. More particularly, the processing device 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 902 may also be one or more special-purpose processing devices such as an application specific integrated circuit (ASIC), a field programmable gate array (FPGA), a digital signal processor (DSP), network processor, or the like. The processing device 902 is configured to surprise removal module 926 for performing the operations and steps discussed herein (e.g., corresponding to the methods of FIGS. 3-7, etc.).

The computer system 900 may further include a network interface device 922. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 920 (e.g., a speaker). In one illustrative example, the video display unit 910, the alphanumeric input device 912, and the cursor control device 914 may be combined into a single component or device (e.g., an LCD touch screen).

The data storage device 916 may include a computer-readable medium 924 on which is stored surprise removal module 926 (e.g., corresponding to the methods of FIGS. 3-7, etc.) embodying any one or more of the methodologies or functions described herein. Surprise removal module 926 may also reside, completely or at least partially, within the main memory 904 and/or within the processing device 902 during execution thereof by the computer system 900, the main memory 904 and the processing device 902 also constituting computer-readable media. Surprise removal module 926 may further be transmitted or received over a network via the network interface device 922.

While the computer-readable storage medium 924 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the invention should, therefore, be determined with reference to the appended claims, along with the full scope of equivalents to which such claims are entitled.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "accessing," "identifying," "removing," "storing," "unmapping," "sending," "starting," "detecting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method for removing a virtual device from a virtual machine having a guest operating system (OS), the virtual machine managed by a hypervisor executing on a processing device, comprising:
receiving, by the hypervisor, a notification from the guest OS, the notification comprising a capability indicator value indicating a support level for surprise removal of a virtual device of the guest OS, the surprise removal of the virtual device comprising removal of the virtual device from the virtual machine without first providing a warning to the guest OS;
storing, by the hypervisor, the capability indicator value corresponding to the virtual device in a mapping table;
subsequently receiving, by the processing device executing the hypervisor, a request to remove the virtual device from the virtual machine;
responsive to receiving the request to remove the virtual device, accessing, by the hypervisor, the mapping table to obtain the capability indicator value corresponding to the virtual device;
identifying, by the processing device executing the hypervisor, in view of the obtained capability indicator value, a particular set of actions associated with the obtained capability indicator value, the particular set of actions to be performed to remove the virtual device from the virtual machine, the particular set of actions including at least removing the virtual device from the virtual machine without first providing the warning to the guest OS when the capability indicator indicates a safe support level, or at least first providing the warning to the guest OS before removing the virtual device from the virtual machine when the capability indicator indicates an unsafe support level; and
removing the virtual device from the virtual machine using the particular set of actions.

2. The method of claim 1, wherein the capability indicator value is one of a plurality of capability indicator values that are each associated with a plurality of support levels, wherein each of the plurality of support levels corresponds to a set of one or more actions to be performed for virtual device removal in the mapping table.

3. The method of claim 1, wherein the obtained capability indicator value corresponds to the safe support level and wherein removing the virtual device comprises:
unmapping the virtual device from the guest operating system of the virtual machine;
sending a removal notification to the guest operating system that the virtual device has been removed from the virtual machine by the hypervisor; and
responsive to receiving an acknowledgment from the guest operating system of the removal notification, freeing hypervisor resources associated with the virtual device.

4. The method of claim 1, wherein the obtained capability indicator value corresponds to a supported support level and wherein removing the virtual device comprises:
sending a removal notification to the guest operating system that the virtual device is to be removed;
starting a timer upon sending the removal notification;
detecting an expiration of the timer prior to receiving a first acknowledgment of the removal notification;
unmapping the virtual device from the guest operating system;
sending a removal acknowledgement notification to the guest operating system that the virtual device has been removed from the virtual machine by the hypervisor; and
responsive to receiving a second acknowledgment from the guest operating system of the removal acknowledgement notification, freeing hypervisor resources associated with the virtual device.

5. The method of claim 4, further comprising:
sending an alert to an administrator to request confirmation to unmap the virtual device from the guest operating system.

6. The method of claim 1, wherein the obtained capability indicator value corresponds to the unsafe support level and wherein removing the virtual device comprises:
sending a removal notification to the guest operating system of the virtual machine that the virtual device is to be removed; and
responsive to receiving an acknowledgment from the guest operating system of the removal notification, unmapping the virtual device from the guest operating system of the virtual machine and freeing hypervisor resources associated with the virtual device.

7. The method of claim 1, wherein a guest operating system of the virtual machine is to:
detect an assignment of the virtual device to the virtual machine;
load a virtual device driver for the virtual device into memory accessible to the guest operating system;
determine the capability indicator value that identifies the support provided by the virtual device driver for recovering from the surprise removal of the virtual device from the virtual machine; and
send the notification to the hypervisor, the notification comprising the capability indicator value.

8. A computing apparatus for removing a virtual device from a virtual machine having a guest operating system (OS), the virtual machine managed by a hypervisor executing on a processing device, the computing apparatus comprising:
a memory; and
a processing device, operatively coupled to the memory, to execute the hypervisor to:
receive a notification from the guest OS, the notification comprising a capability indicator value indicating a support level for surprise removal of a virtual device of the guest OS, the surprise removal of the virtual device from the virtual machine without first providing a warning to the guest OS;
store the capability indicator value corresponding to the virtual device in a mapping table;
subsequently receive a request to remove the virtual device from the virtual machine;
responsive to receiving the request to remove the virtual device, access the mapping table to obtain the capability indicator value corresponding to the virtual device;
identify, in view of the obtained capability indicator value, a particular set of actions associated with the obtained capability indicator value, the particular set of actions to be performed to remove the virtual device from the virtual machine, the particular set of actions including at least removing the virtual device from the virtual machine without first providing the warning to the guest OS when the capability indicator indicates a safe support level, or at least first providing the warning to the guest OS before removing the virtual device from the virtual machine when the capability indicator indicates an unsafe support level; and
remove the virtual device from the virtual machine using the particular set of actions.

9. The computing apparatus of claim 8, wherein the capability indicator value is one of a plurality of capability indicator values that are each associated with a plurality of support levels, wherein each of the plurality of support levels corresponds to a set of one or more actions to be performed for virtual device removal in the mapping table.

10. The computing apparatus of claim 8, wherein the obtained capability indicator value corresponds to the safe support level and wherein to remove the virtual device, the processing device is to:
unmap the virtual device from the guest operating system of the virtual machine;
send a removal notification to the guest operating system that the virtual device has been removed from the virtual machine by the hypervisor; and
responsive to receiving an acknowledgment from the guest operating system of the removal notification, free hypervisor resources associated with the virtual device.

11. The computing apparatus of claim 8, wherein the obtained capability indicator value corresponds to a supported support level and wherein to remove the virtual device, the processing device is to:
send a removal notification to the guest operating system that the virtual device is to be removed;
start a timer upon sending the removal notification;
detect an expiration of the timer prior to receiving a first acknowledgment of the removal notification;
unmap the virtual device from the guest operating system;
send a removal acknowledgement notification to the guest operating system that the virtual device has been removed from the virtual machine by the hypervisor; and responsive to receiving a second acknowledgment from the guest operating system of the removal acknowledgement notification, free hypervisor resources associated with the virtual device.

12. The computing apparatus of claim 8, wherein the obtained capability indicator value corresponds to the unsafe support level and wherein to remove the virtual device, the processing device is to:
send a removal notification to the guest operating system of the virtual machine that the virtual device is to be removed; and
responsive to receiving an acknowledgment from the guest operating system of the removal notification, unmap the virtual device from the guest operating system of the virtual machine and freeing hypervisor resources associated with the virtual device.

13. The computing apparatus of claim 8, wherein the virtual machine is to:
detect an assignment of the virtual device to the virtual machine;
load the virtual device driver for the virtual device into memory accessible to the guest operating system of the virtual machine;
determine the capability indicator value that identifies the support provided by the virtual device driver for recovering from the surprise removal of the virtual device from the virtual machine; and
send the notification to the hypervisor, the notification comprising the capability indicator value.

14. A non-transitory computer readable storage medium for removing a virtual device from a virtual machine having a guest operating system (OS), the virtual machine managed by a hypervisor, the non-transitory computer-readable storage medium having instructions stored therein, which when executed by a processing device of a computer system, cause the processing device to:
receive, by the hypervisor, a notification from the guest OS, the notification comprising a capability indicator value indicating a support level for surprise removal of a virtual device of the guest OS, the surprise removal of the virtual device comprising removal of the virtual device from the virtual machine without first providing a warning to the guest OS;
store, by the hypervisor, the capability indicator value corresponding to the virtual device in a mapping table;
subsequently receive, by the hypervisor, a request to remove the virtual device from the virtual machine;
responsive to receiving the request to remove the virtual device, access, by the hypervisor, the mapping table to obtain the capability indicator value corresponding to the virtual device;
identify, by the hypervisor, in view of the obtained capability indicator value, a particular set of actions associated with the obtained capability indicator value, the particular set of actions to be performed to remove the virtual device from the virtual machine, the particular set of actions including at least removing the virtual device from the virtual machine without first providing the warning to the guest OS when the capability indicator indicates a safe support level, or at least first providing the warning to the guest OS before removing the virtual device from the virtual machine when the capability indicator indicates an unsafe support level; and
remove the virtual device from the virtual machine using the particular set of actions.

15. The computing apparatus of claim 11, wherein the processing device is further to send an alert to an administrator to request confirmation to unmap the virtual device from the guest operating system.

16. The non-transitory computer readable storage medium of claim 14, wherein the obtained capability indicator value corresponds to the safe support level and wherein to remove the virtual device, the processing device is to:
   unmap the virtual device from the guest operating system of the virtual machine;
   send a removal notification to the guest operating system that the virtual device has been removed from the virtual machine by the hypervisor; and
   responsive to receiving an acknowledgment from the guest operating system of the removal notification, free hypervisor resources associated with the virtual device.

17. The non-transitory computer readable storage medium of claim 14, wherein the obtained capability indicator value corresponds to a supported support level and wherein to remove the virtual device, the processing device is to:
   send a removal notification to the guest operating system that the virtual device is to be removed;
   start a timer upon sending the removal notification;
   detect an expiration of the timer prior to receiving a first acknowledgment of the removal notification;
   unmap the virtual device from the guest operating system;
   send a removal acknowledgement notification to the guest operating system that the virtual device has been removed from the virtual machine by the hypervisor; and
   responsive to receiving a second acknowledgment from the guest operating system of the removal acknowledgement notification, free hypervisor resources associated with the virtual device.

18. The non-transitory computer readable storage medium of claim 14, wherein the obtained capability indicator value corresponds to the unsafe support level and wherein to remove the virtual device, the processing device is to:
   send a removal notification to the guest operating system of the virtual machine that the virtual device is to be removed; and
   responsive to receiving an acknowledgment from the guest operating system of the removal notification, unmap the virtual device from the guest operating system of the virtual machine and freeing hypervisor resources associated with the virtual device.

19. The non-transitory computer readable storage medium of claim 14 wherein the guest operating system of the virtual machine is to:
   detect an assignment of the virtual device to the virtual machine;
   load the virtual device driver for the virtual device into memory accessible to the guest operating system;
   determine the capability indicator value that identifies the support provided by the virtual device driver for recovering from the surprise removal of the virtual device from the virtual machine; and
   send the notification to the hypervisor, the notification comprising the capability indicator value.

20. The non-transitory computer readable storage medium of claim 14, wherein the capability indicator value is one of a plurality of capability indicator values that are each associated with a plurality of support levels, wherein each of the plurality of support levels corresponds to a set of one or more actions to be performed for virtual device removal in the mapping table.

* * * * *